(12) United States Patent
Nogami et al.

(10) Patent No.: US 10,746,040 B2
(45) Date of Patent: Aug. 18, 2020

(54) STEAM TURBINE SYSTEM AND METHOD FOR STARTING STEAM TURBINE

(71) Applicant: MITSUBISHI HEAVY INDUSTRIES COMPRESSOR CORPORATION, Tokyo (JP)

(72) Inventors: Tomoaki Nogami, Hiroshima (JP); Takuro Koda, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 0 days.

(21) Appl. No.: 16/465,084

(22) PCT Filed: Feb. 24, 2017

(86) PCT No.: PCT/JP2017/007228
§ 371 (c)(1),
(2) Date: May 29, 2019

(87) PCT Pub. No.: WO2018/154735
PCT Pub. Date: Aug. 30, 2018

(65) Prior Publication Data
US 2019/0292928 A1  Sep. 26, 2019

(51) Int. Cl.
*F01D 11/02* (2006.01)
*F02C 7/28* (2006.01)
(Continued)

(52) U.S. Cl.
CPC .......... *F01D 11/025* (2013.01); *F01D 11/003* (2013.01); *F01D 11/04* (2013.01);
(Continued)

(58) Field of Classification Search
CPC ........ F01D 11/00; F01D 11/02; F01D 11/025; F01D 11/04; F01D 11/06; F01D 11/003;
(Continued)

(56) References Cited

U.S. PATENT DOCUMENTS

| 3,537,265 A | 11/1970 | Brown |
| 3,705,494 A | 12/1972 | Bow et al. |
| 4,517,804 A | 5/1985 | Ura et al. |
| 5,192,083 A * | 3/1993 | Jones, Jr. ............... F16J 15/441 |
| | | 277/411 |
| 5,344,160 A | 9/1994 | Scarlata et al. |
| 5,941,506 A | 8/1999 | Smith et al. |
| 8,540,479 B2 | 9/2013 | Awtar et al. |

(Continued)

FOREIGN PATENT DOCUMENTS

| JP | S49-029975 B | 8/1974 |
| JP | S58-079606 A | 5/1983 |

(Continued)

OTHER PUBLICATIONS

Decision to Grant a Patent corresponding to Japanese Application No. 2017-563267, dated Jan. 9, 2018 (5 pages).

(Continued)

*Primary Examiner* — Mark A Laurenzi
*Assistant Examiner* — Xiaoting Hu
(74) *Attorney, Agent, or Firm* — Osha Liang LLP

(57) ABSTRACT

A steam turbine system includes: a steam turbine having a casing into which steam is fed from an outside of the casing and a rotating shaft that is provided within the casing so as to be rotatable around a central axis; a deaerator that is connected to the steam turbine and that deaerates leaked steam that has leaked from a gap between the casing and the rotating shaft to the outside of the casing; a vacuum pump that is connected to the deaerator and that lowers a pressure within the deaerator; and a shaft sealing device that is connected to the deaerator and that seals the gap between the casing and the rotating shaft. The shaft sealing device has a seal member having a seal body, a housing, a biasing member, and a negative-pressure introduction part.

8 Claims, 3 Drawing Sheets

(51) Int. Cl.
*F01D 11/04* (2006.01)
*F01D 11/00* (2006.01)
*F01K 7/16* (2006.01)
*F01K 11/02* (2006.01)
*F16J 15/34* (2006.01)

(52) U.S. Cl.
CPC .............. *F01K 7/16* (2013.01); *F01K 11/02* (2013.01); *F02C 7/28* (2013.01); *F05D 2240/59* (2013.01); *F05D 2260/6022* (2013.01); *F16J 15/346* (2013.01); *F16J 15/3452* (2013.01)

(58) Field of Classification Search
CPC ... F01D 19/00; F01K 9/00; F01K 9/02; F01K 7/16; F01K 11/02; F02C 7/28; F16J 15/3452; F16J 15/346; F28B 9/10; F05D 2240/55; F05D 2240/59; F05D 2240/63; F05D 2260/6022
See application file for complete search history.

(56) References Cited

U.S. PATENT DOCUMENTS

2010/0239415 A1  9/2010  Turnquist et al.
2011/0068539 A1  3/2011  Nakano et al.

FOREIGN PATENT DOCUMENTS

| JP | S60-159313 A | 8/1985 |
| JP | 2009-293784 A | 12/2009 |
| JP | 2010-223224 A | 10/2010 |

OTHER PUBLICATIONS

International Search Report issued in corresponding International Patent Application No. PCT/JP2017/007228, dated Apr. 11, 2017 (4 pages).

Written Opinion issued in corresponding International Patent Application No. PCT/JP2017/007228, dated Apr. 11, 2017 (9 pages).

\* cited by examiner

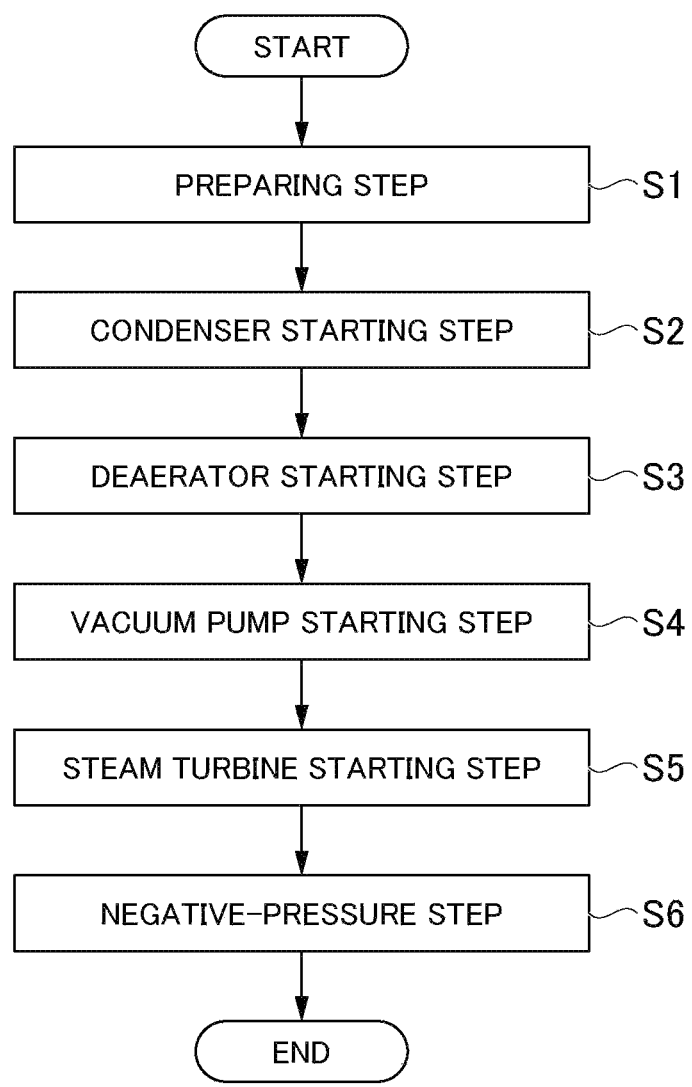

STEAM TURBINE SYSTEM AND METHOD FOR STARTING STEAM TURBINE

TECHNICAL FIELD

The present invention relates to a steam turbine system and a method for starting a steam turbine.

BACKGROUND ART

In order to drive compressors, generators, or the like, steam turbines may be used. The steam turbines include a casing and a rotor. The rotor includes a rotating shaft that is rotatably supported by the casing, and turbine blades that are provided integrally with the rotating shaft. At least an output-side end part of the rotating shaft protrudes outward through the casing. In such steam turbines, the rotor is rotated by causing steam fed into the casing from the outside to collide against the turbine blades. A driving target is driven by transmitting the rotation of the rotor to the driving target via the end part of the rotating shaft that protrudes to the outside of the casing.

Steam turbine systems for which such steam turbines are used are provided with a condenser that condenses the steam discharged from a steam turbine, and a ground condenser for discharging the air suctioned into the steam turbine and the steam that leaks to the outside of the steam turbine. In the steam turbine systems, auxiliary steam is used from the outside when the steam turbine, the condenser and the ground condenser are started. Specifically, in the steam turbine, leak of air into the casing is limited when the auxiliary steam is used as seal steam and the inside of the casing is vacuumed. Additionally, in the condenser and the ground condenser, internal air is discharged to the outside by driving an ejector using the auxiliary steam.

Additionally, a steam turbine system described in Patent Document 1 discloses a structure in which the amount of seal steam leaking out of a steam turbine is reduced. Specifically, in the steam turbine system, a seal between a rotating shaft and a casing in the steam turbine has a structure in which a plurality of labyrinth seals and a circumferential direction seal are combined with each other. By adopting such a structure, the amounts of steam and air that leaks out from the seal are reduced.

Meanwhile, even in the steam turbine system as disclosed in Patent Document 1, it is necessary to provide a ground condenser in order to discharge the steam and air that slightly leak from the seal. For that reason, in order to discharge the steam and air within the ground condenser to the outside, it is necessary to supply auxiliary steam to the ground condenser.

CITATION LIST

Patent Literature

[Patent Document 1] Specification of U.S. Pat. No. 5,344,160

SUMMARY OF INVENTION

Technical Problem

However, the auxiliary steam is often required during the operation of the steam turbine, and a steam supply source other than the steam turbine should be separately provided and supplied. For that reason, facilities, such as pipes and valves connected to the steam supply source, staff who operate valves that adjust supply states, the energy for creation of the auxiliary steam in the steam supply source, and the like are required for the supply of the auxiliary steam. For this reason, it is desired to reduce locations for using the auxiliary steam.

The invention provides a steam turbine system and a method for starting a steam turbine capable of reducing locations for using auxiliary steam.

Solution to Problem

A steam turbine system related to a first aspect of the invention includes a steam turbine having a casing into which steam is fed from an outside of the casing, and a rotating shaft that is provided within the casing so as to be rotatable around a central axis; a deaerator that is connected to the steam turbine and is configured to deaerate leaked steam that has leaked from a gap between the casing and the rotating shaft to the outside of the casing; and a vacuum pump that is connected to the deaerator and configured to lower a pressure within the deaerator.

According to such a configuration, the water included in the leaked steam can be recoverable by deaerating the leaked steam with the deaerator. The recovered water is not thrown away but supplied to a boiler or the like for generating the steam, whereby the water can be reused. Additionally, by lowering the pressure within the deaerator with the vacuum pump, the deaerated air can be discharged to the outside without providing an ejector. Hence, it is unnecessary to use the auxiliary steam as a drive source of the ejector. In this way, the leaked steam is processed without using the auxiliary steam.

The steam turbine system related to a second aspect of the invention based on the first aspect may further include a condenser that is configured to condense the steam discharged from the steam turbine, and the condenser may be connected to the deaerator and is supplied with water recovered from the leaked steam deaerated by the deaerator.

According to such a configuration, the recovered water can be effectively used by returning the water recovered by the deaerator to the condenser.

In the steam turbine system related to a third aspect based on the second aspect, the vacuum pump may be connected to the condenser.

According to such a configuration, the air within the condenser can be discharged to the outside without providing the ejector in order to lower the pressure within the condenser. Hence, it is unnecessary to use the auxiliary steam as the drive source of the ejector. Accordingly, locations for using the auxiliary steam can be further reduced.

In the steam turbine system related to a fourth aspect of the invention based on any one of the first to third aspects, the deaerator may have a heater that is configured to heat an inside thereof.

According to such a configuration, the leaked steam, which has been supplied to the deaerator and condensed, is heated. For that reason, the deaeration of the leaked steam can be promoted, and the deaeration can be efficiently performed.

In the steam turbine system related to a fifth aspect of the invention based on any one of the first to fourth aspects, the steam turbine may include a shaft sealing device that is connected to the deaerator and configured to seal the gap between the casing and the rotating shaft, and the shaft sealing device may have a seal member having a seal body that is configured to seal a portion between the seal body and an outer peripheral surface of the rotating shaft, and a pressure-receiving part that is connected to the seal body and configured to move the seal body in a radial direction of the rotating shaft, a housing that holds the pressure-receiving part in an accommodating recess formed therein so as to be movable in the radial direction, a biasing member that is configured to bias the pressure-receiving part toward an inside of the radial direction, and a negative-pressure introduction part that is configured to make a pressure inside the accommodating recess lower than a pressure outside the housing.

According to such a configuration, in a state where the pressure within the accommodating recess is not lowered by the negative-pressure introduction part, the seal member is biased inward in the radial direction by the biasing member and approaches the rotating shaft. For that reason, the sealing performance between the rotating shaft and the casing is ensured by the seal member. Accordingly, at the time of the activation of the steam turbine, it is limited that external air flows into the casing from between the rotating shaft and the casing. Hence, at the time of the activation of the steam turbine, it is unnecessary to supply the auxiliary steam to the shaft sealing device from the outside in order to enhance the sealing performance between the rotating shaft and the casing. Additionally, in a state where the steam turbine is operating, the pressure within the accommodating recess is lowered by the negative-pressure introduction part. Accordingly, the seal body can be moved outward in the radial direction and can be spaced apart from the rotating shaft. Accordingly, damage to the seal body caused by the contact between the rotating shaft that rotates and the seal body can be limited. Additionally, in the state where the steam turbine is operating, the pressure within the casing is high. Therefore, the steam within the casing leaks out from the gap between the rotating shaft and the casing to the outside. As a result, it is possible to avoid the suction of air into the casing, and even in a state where the seal member and the rotating shaft are separated from each other, the sealing performance in the gap can be ensured.

In the steam turbine system related to a sixth aspect based on the fifth aspect, the seal body may be capable of coming in contact with the rotating shaft and include a free-cutting material that is formed of a material having higher machinability than the rotating shaft.

According to such a configuration, by bringing the seal body including the free-cutting material into contact with the rotating shaft, the gap between the rotating shaft and the casing can be brought close to 0 (zero), and high sealing performance can be exhibited. Accordingly, the amount of inflow of air into the casing from the outside can be limited to the minimum.

The steam turbine system related to a seventh aspect based on the fifth or sixth aspect may further include a control device that is configured to control the negative-pressure introduction part so as to lower a pressure within the accommodating recess depending on an operation of the steam turbine.

According to such a configuration, by controlling a control valve depending on the operation of the steam turbine, the adjustment of pressure within the accommodating recess by the negative-pressure introduction part can be executed irrespective of a worker.

In the steam turbine system related to an eighth aspect based on the seventh aspect, the control device may cause the negative-pressure introduction part to lower the pressure within the accommodating recess in a case where a pressure of the steam within the casing is equal to or higher than a predetermined pressure.

According to such a configuration, in the shaft sealing device, the gap between the casing and the rotating shaft can be opened at a timing when the pressure of the steam within the casing rises and reliably functions as the seal steam.

A method for starting a steam turbine system related to a ninth aspect of the invention is a method for starting a steam turbine system including a steam turbine having a casing into which steam is fed from an outside of the casing, a rotating shaft that is provided within the casing so as to be rotatable around a central axis, and a shaft sealing device that is configured to seal a gap between the casing and the rotating shaft. The shaft sealing device has a seal member having a seal body that is configured to seal a portion between the seal body and an outer peripheral surface of the rotating shaft, and a pressure-receiving part that is connected to the seal body and configured to move the seal body in a radial direction of the rotating shaft, a housing that holds the pressure-receiving part in an accommodating recess formed therein so as to be movable in the radial direction, a biasing member that is configured to bias the pressure-receiving part toward an inside of the radial direction, and a negative-pressure introduction part that is configured to make a pressure inside the accommodating recess lower than a pressure outside the housing. The method includes a negative-pressure step of causing the negative-pressure introduction part to make the pressure within the accommodating recess into a negative pressure in a case where a pressure of the steam within the casing is equal to or higher than a predetermined pressure.

Advantageous Effects of Invention

According to the invention, it is possible to reduce locations for using the auxiliary steam.

BRIEF DESCRIPTION OF DRAWINGS

FIG. 3 is a flowchart showing a flow of a method for starting the steam turbine system of the invention.

DESCRIPTION OF EMBODIMENTS

Figure 1:
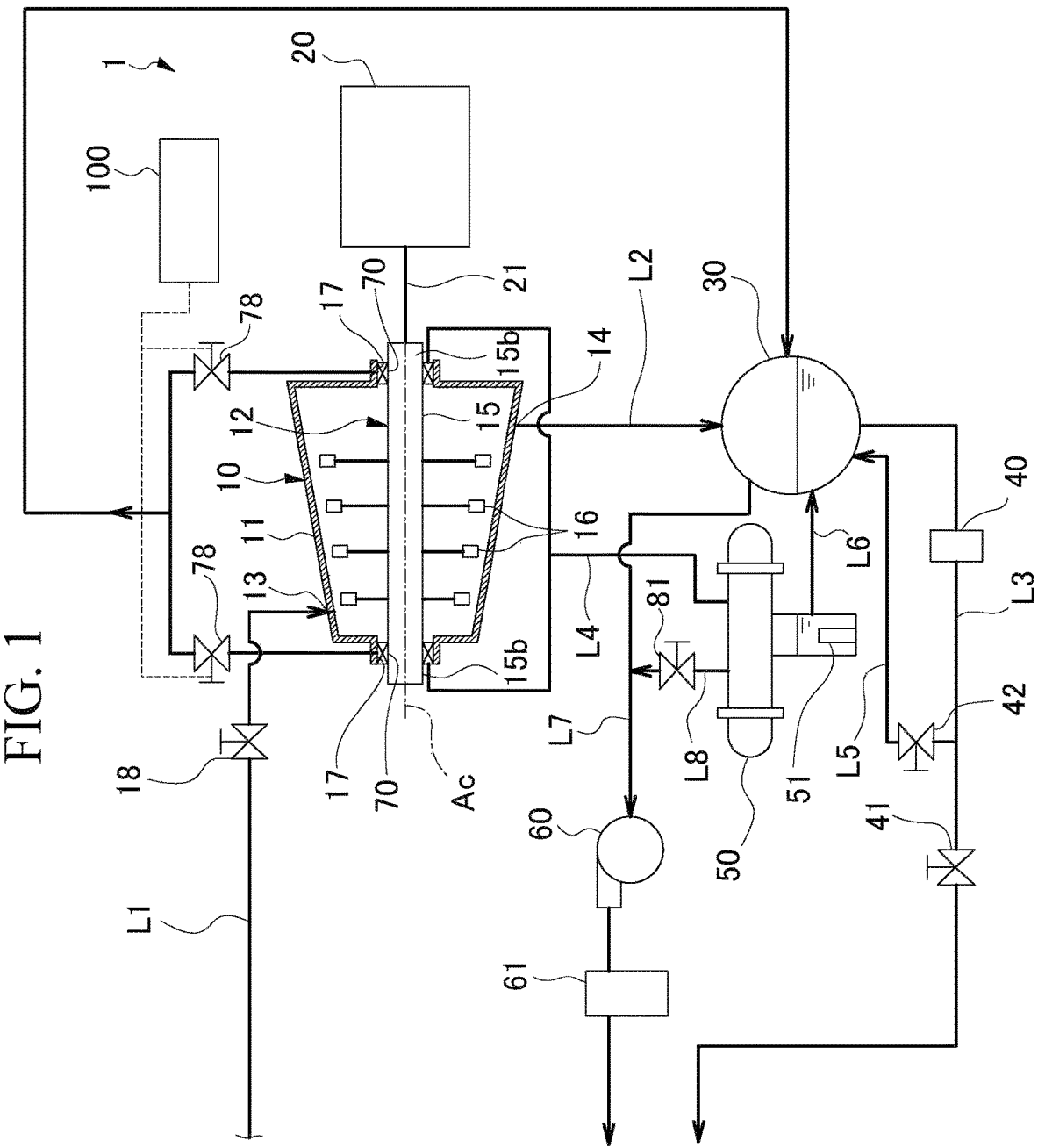
FIG. 1 is a view showing a schematic configuration of a steam turbine system in an embodiment of the invention.
Figure 2:
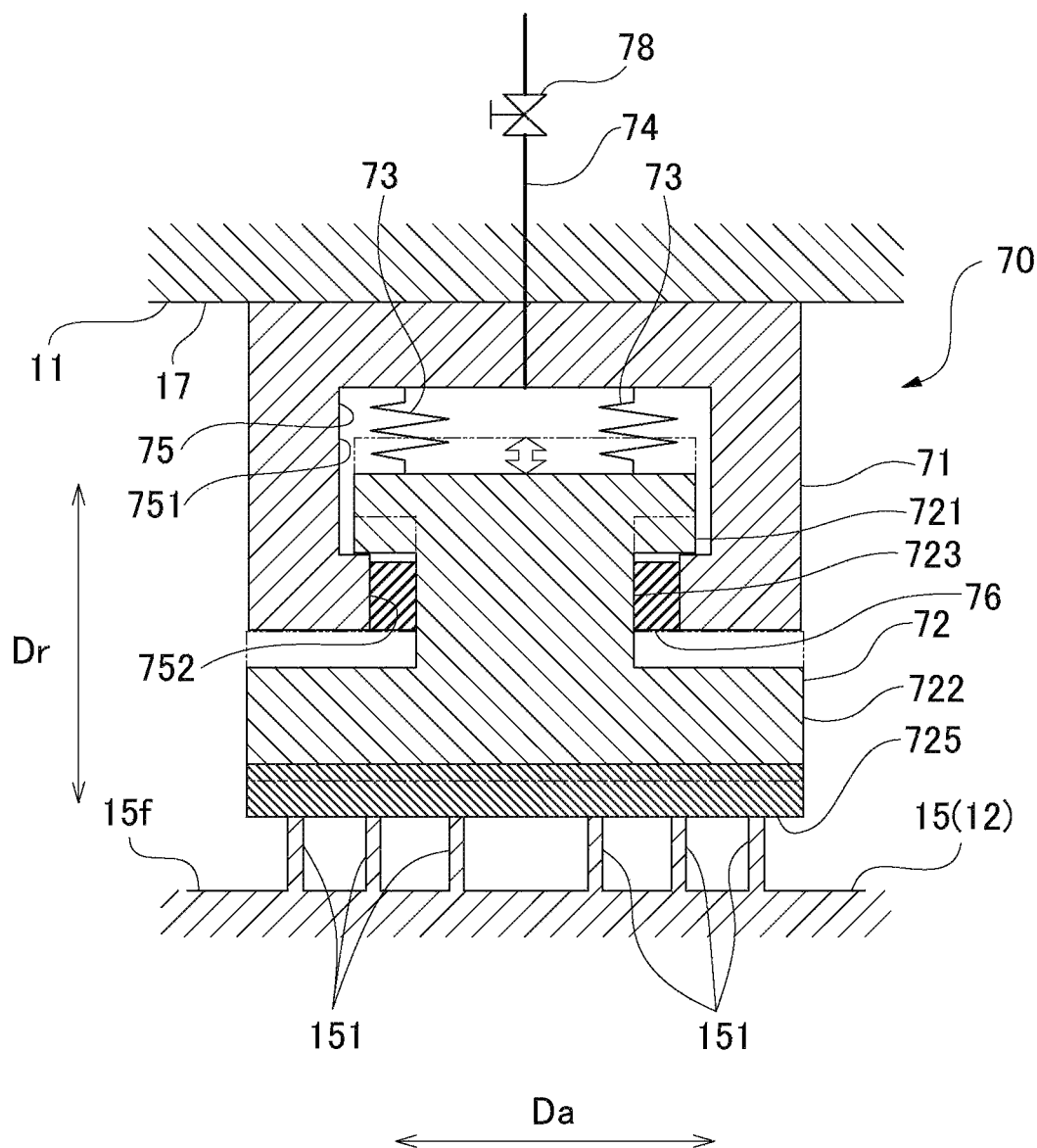
FIG. 2 is a sectional view showing a shaft sealing device provided in the steam turbine of the steam turbine system in the embodiment of the invention.

Hereinafter, a steam turbine, a steam turbine system, and a method for starting a steam turbine in the invention will be described with reference to the drawing. FIG. 1 is a view showing a schematic configuration of the steam turbine system in the embodiment of the invention. FIG. 2 is a sectional view showing a shaft sealing device provided in the steam turbine of the steam turbine system.

As shown in FIG. 1, a steam turbine system 1 includes a steam turbine 10, a compressor 20, a condenser 30, a condensate pump 40, a deaerator 50, a vacuum pump 60, and a control device 100.

The steam turbine 10 includes a casing 11 and a rotor 12. Steam is fed into the casing 11 from the outside. The casing 11 has a tubular shape extending in an axial direction Da in which a central axis Ac of the rotor 12 extends. The casing 11 has a steam inlet 13 provided on a first side in the axial direction Da, and a steam outlet 14 provided on a second side in the axial direction Da. A steam supply line L1 is connected to the steam inlet 13. Steam created in an external boiler (not shown) is supplied to the steam inlet 13 through the steam supply line L1. The steam supply line L1 is provided with an opening and closing valve 18. By opening and closing the opening and closing valve 18, the amount of introduction of the steam from the boiler (not shown) to the steam turbine 10 is adjusted. Additionally, a steam discharge line L2 is connected to the steam outlet 14.

The rotor 12 is rotatably provided with respect to the casing 11. The rotor 12 includes a rotating shaft 15 and turbine blades 16.

The rotating shaft 15 is provided so as to be rotatable around the central axis Ac within the casing 11. The rotating shaft 15 has both end parts 15a and 15b supported by bearings (not shown) so as to be rotatable around the central axis Ac. The rotating shaft 15 is accommodated inside the casing 11 in a state where both the end parts 15a and 15b protrude to the outside. Both the end parts 15a and 15b of the rotating shaft 15 protrude to the outside of the casing 11 from openings 17 that are respectively formed at both the end parts of the casing 11 in the axial direction Da.

The turbine blades 16 are provided on an outer peripheral surface 15f of the rotating shaft 15 so as to extend radially outward. The turbine blades 16 are made rotatable around the central axis Ac together with the rotating shaft 15.

In such a steam turbine 10, the steam created by the boiler (not shown) is introduced into the casing 11 from the steam inlet 13 through the steam supply line L1. The steam introduced into the casing 11 flows toward the steam outlet 14 side from the steam inlet 13 side. If this steam collides against the turbine blades 16 of the rotor 12, the rotor 12 rotates around the central axis Ac. The steam that has arrived at the steam outlet 14 of the casing 11 is discharged to the outside of the casing 11 through the steam discharge line L2.

The steam turbine 10 drives, for example, the compressor 20. The compressor 20 is coupled to an end part 15b of the rotating shaft 15 via a connecting shaft 21. The compressor 20 is driven by the rotation of the rotating shaft 15 being transmitted via the connecting shaft 21 if the rotor 12 of the steam turbine 10 rotates.

The condenser 30 is connected to the steam turbine 10 by the steam discharge line L2. The condenser 30 cools and condenses the steam discharged from the steam outlet 14 of the casing 11 through the steam discharge line L2. The condenser 30 is connected to a wastewater line L3. The condenser 30 discharges accumulated water from the wastewater line L3. The condenser 30 is connected to a first suction line L7. The condenser 30 discharges air flowing in from a gap, such as a device joining part, from the first suction line L7. The condenser 30 is connected to a circulation line L5. The circulation line L5 is connected to the wastewater line L3.

The condensate pump 40 is provided in the wastewater line L3. The condensate pump 40 circulates the water condensed by the condenser 30 to the boiler (not shown) through the wastewater line L3. An opening and closing valve 41 is provided downstream of the condensate pump 40 of the wastewater line L3. The opening and closing valve 41 is disposed downstream of a connecting position between the circulation line L5 in the wastewater line L3. The circulation line L5 is provided with an opening and closing valve 42. The amount of introduction to the boiler and the amount of return to the condenser 30 are adjusted by the opening and closing valves 41 and 42.

The deaerator 50 is connected to the steam turbine 10. The deaerator 50 deaerates leaked steam that has leaked from a gap between the casing 11 and the rotating shaft 15 to the outside of the casing 11. The deaerator 50 of the present embodiment deaerates leaked steam (ground steam) that has leaked from gaps between both the end parts 15a and 15b of the rotating shaft 15 of the steam turbine 10 and the openings 17 of the casing 11. For this reason, the deaerator 50 communicates with the gaps between both the end parts 15a and 15b of the rotating shaft 15 of the steam turbine 10 and the openings 17 of the casing 11 via a leaked steam line L4. The deaerator 50 includes a heater 51 inside. The heater 51 heats the inside of the deaerator 50 and promotes the deaeration of the leaked steam. The deaerator 50 of the present embodiment is configured in a shell and tube format.

The deaerator 50 is connected to the condenser 30 via a condensate recovery line L6. The deaerator 50 supplies starting water to the condenser 30 when the steam turbine 10 is started. The deaerator 50 supplies the leaked steam and the water (a liquid component) obtained by deaerating the condensed water to the condenser 30 through the condensate recovery line L6 during the operation of the steam turbine 10. Accordingly, the deaerator 50 controls the liquid level of the condenser 30 during the operation of the steam turbine 10.

The vacuum pump 60 is connected to the condenser 30 via the first suction line L7. The vacuum pump 60 is connected to the deaerator 50 via a second suction line L8. The second suction line L8 is connected to the middle of the first suction line L7. An opening and closing valve 81 is provided in the middle of the second suction line L8. The vacuum pump 60 suctions the air inside the condenser 30 and the deaerator 50. Accordingly, the vacuum pump 60 lowers pressures inside the condenser 30 and the deaerator 50, respectively to negative pressures. A drain separator 61 is provided on a downstream side of the vacuum pump 60. The drain separator 61 further separates the air suctioned by the vacuum pump 60 into gas and liquid. A liquid-phase component and a gas-phase component subjected to the gas-liquid separation by the drain separator 61 are discharged to the outside, respectively.

The steam turbine 10 as described above includes a shaft sealing device 70 that seals the gap between the casing 11 and the rotating shaft 15. The shaft sealing device 70 is provided in the gap between each of the openings 17 formed at both the end parts of the casing 11 and each of both the end parts 15a and 15b of the rotating shaft 15. Accordingly, the shaft sealing device 70 seals a portion between each opening 17 and the outer peripheral surface 15f of the rotating shaft 15 and suppresses the leakage of the steam to the outside of the casing 11. The shaft sealing device 70 is connected to the deaerator 50 via the leaked steam line L4. The size of a clearance between the shaft sealing device 70 and the outer peripheral surface 15f of the rotating shaft 15 is made adjustable. The shaft sealing device 70 of the present embodiment is disposed in an environment under an atmospheric pressure that faces the outside of the casing 11. As shown in FIG. 2, the shaft sealing device 70 includes a housing 71, a seal member 72, a biasing member 73, and a negative-pressure introduction part 74.

The housing 71 is fixed inside the opening 17 in a radial direction Dr of the casing 11. A groove 75, which extends continuously in a circumferential direction around the central axis Ac of a rotor 12, is formed in the housing 71. The groove 75 has an accommodating recess 751 having a rectangular section, and a communication part 752 that allows the accommodating recess 751 to communicate with the rotating shaft 15 side on a radially inner side. In the communication part 752, the dimension of an opening in the axial direction Da in which the central axis Ac extends is smaller than the width dimension of the accommodating recess 751 in the axial direction Da. The housing 71 holds a pressure-receiving part 721 of the seal member 72 (to be described below) in the accommodating recess 751 formed therein so as to be movable in the radial direction.

The position of the seal member 72 in the radial direction Dr with respect to the outer peripheral surface 15*f* of the rotating shaft 15 is made movable. The seal member 72 is made movable relative to the housing 71 in the radial direction Dr. The seal member 72 has an annular shape. The seal member 72 integrally includes the pressure-receiving part 721, a base part 722, a coupling part 723, and a seal body 725.

The pressure-receiving part 721 is accommodated within the accommodating recess 751 so as to be movable in the radial direction Dr. The pressure-receiving part 721 is connected to the seal body 725 via the base part 722 and the coupling part 723. The pressure-receiving part 721 moves the seal body 725 (to be described below) in the radial direction Dr. The pressure-receiving part 721 is formed such that the width dimension thereof in the axial direction Da is shorter than the width dimension of the accommodating recess 751 in the axial direction Da and is longer than the width dimension of the communication part 752 in the axial direction Da.

The base part 722 is provided inside the housing 71 in the radial direction Dr. The width dimension of the base part 722 in the axial direction Da is larger than the width dimension of the communication part 752 in the axial direction Da. The width dimension, in the axial direction Da, of the base part 722 of the present embodiment is made approximately equal to the width dimension of the housing 71 in the axial direction Da.

The coupling part 723 couples the pressure-receiving part 721 and the base part 722 to each other. The coupling part 723 is made movable in the radial direction Dr inside the communication part 752.

Here, the shaft sealing device 70 may include a sealing member 76, which seals a gap between the communication part 752 and the coupling part 723, between the communication part 752 of the housing 71 and the coupling part 723 of the seal member 72. The sealing member 76 is fixed to the coupling part 723. The sealing member 76 is made slidable with respect to the coupling part 723 such that the coupling part 723 is movable in the radial direction Dr with respect to the communication part 752.

The seal body 725 seals a portion between the seal body 725 and the outer peripheral surface 15*f* of the rotating shaft 15. The seal body 725 is fixed inside the base part 722 in the radial direction Dr. An inner peripheral surface of the rotating shaft 15 is capable of coming in contact with the seal body 725. The seal body 725 includes a free-cutting material formed of a material having higher machinability than the rotating shaft 15. The seal body 725 of the present embodiment is made of, for example, only an abradable material.

In addition, the seal body 725 is not limited to the abradable material and may include the free-cutting material. The seal body 725 may include, for example, a carbon material.

Additionally, in the present embodiment, a plurality of seal projections 151 are provided in a region of the outer peripheral surface 15*f* of the rotating shaft 15 corresponding to a region where the shaft sealing device 70 is provided. The plurality of seal projections 151 are formed on the outer peripheral surface 15*f* facing the seal body 725 so as to be spaced apart in the axial direction Da. The seal projections 151 are formed integrally with the rotating shaft 15. The seal projections 151 protrude toward the outside of the radial direction Dr from the outer peripheral surface 15*f*. The seal body 725 exhibits sealing performance by coming into sliding contact with the seal projections 151 that rotate while being scraped.

The biasing member 73 biases the pressure-receiving part 721 toward the inside of the radial direction Dr. The biasing member 73 is provided within the accommodating recess 751. The biasing member 73 is an elastic member, such as a disc spring or a leaf spring. A plurality of the (two) biasing members 73 of the present embodiment are provided. The biasing member 73 presses the pressure-receiving part 721 toward the inside of the radial direction Dr and is contracted by receiving a force toward the outside of the radial direction Dr from pressure-receiving part 721.

The negative-pressure introduction part 74 makes the pressure inside the accommodating recess 751 lower than the pressure outside the housing 71. The negative-pressure introduction part 74 of the present embodiment is a pipe that connects the accommodating recess 751 and a negative-pressure source to each other. The negative-pressure introduction part 74 is directly connected to the condenser 30, for example, such that the condenser 30 shown in FIG. 1 is the negative-pressure source. In addition, the negative-pressure introduction part 74 may be directly connected to the vacuum pump 60, for example, such that the vacuum pump 60 shown in FIG. 1 is the negative-pressure source. The negative-pressure introduction part 74 lowers the pressure within the accommodating recess 751, thereby suctioning the pressure-receiving part 721 toward the outside of the radial direction Dr. The negative-pressure introduction part 74 has a control valve 78. The control valve 78 is opened, thereby releasing circulation within a pipe that is the negative-pressure introduction part 74, and is closed, thereby cutting off the circulation within the pipe.

In such a shaft sealing device 70, the pressure-receiving part 721 is pressed inward the radial direction Dr due to a biasing force resulting from the biasing member 73 in a case where the control valve 78 is closed. As a result, the seal body 725 approaches the outer peripheral surface 15*f* of the rotating shaft 15, and the seal body 725 comes into sliding contact with the seal projections 151. Accordingly, the gap between the opening 17 of the casing 11 and the rotating shaft 15 is sealed by the shaft sealing device 70, and entry of air into the casing 11 from the outside is prevented.

On the other hand, in a case where the control valve 78 is opened, the shaft sealing device 70 lowers the pressure within the accommodating recess 751 to move the pressure-receiving part 721 outward in the radial direction Dr against the biasing force of the biasing member 73. As a result, the seal body 725 moves away from the outer peripheral surface 15*f* of the rotating shaft 15, and the seal body 725 separates from the seal projections 151. Accordingly, a gap is formed between the seal body 725 and the seal projections 151, and the gap is formed between the opening 17 of the casing 11 and the rotating shaft 15.

The control device 100 controls the negative-pressure introduction part 74 so as to lower the pressure within the accommodating recess 751 depending on the operation of the steam turbine 10. The control device 100 of the present embodiment causes the negative-pressure introduction part 74 to lower the pressure within the accommodating recess 751 in a case where the pressure of the steam within the casing 11 is equal to or higher than a predetermined pressure. Specifically, the control device 100 opens the control valve 78 when the pressure of the steam within the casing 11 exceeds a specified value. The control device 100 closes the control valve 78 when the pressure of the steam within the casing 11 is less than the specified value. Here, the specified value is, for example, a pressure value within the casing 11 when the steam turbine 10 is brought into a rated operation.

Next, a method for operating the steam turbine system 1 will be described. FIG. 3 is a flowchart showing a flow of a method for starting the steam turbine system of the invention. Hereinafter, the method for starting the steam turbine system 1 will be described, referring to FIG. 3. Prior to starting the steam turbine system 1, it is checked that the respective parts of the opening and closing valve 18, the control valve 78, and the like are in preset predetermined opened/closed states. Here, the opening and closing valve 18 and the control valve 78 are brought into closed states (preparing step S1). In the shaft sealing device 70, since the control valve 78 is in the closed state, the pressure inside the accommodating recess 751 is not a negative pressure. Accordingly, in the shaft sealing device 70, the seal member 72 moves inward in the radial direction Dr due to the biasing force of the biasing member 73, and the seal body 725 are in contact with the seal projections 151. As a result, the gap between the opening 17 of the casing 11 and the rotating shaft 15 is sealed by the shaft sealing device 70.

Next, the operation of the condenser 30, the deaerator 50, and the steam turbine 10 is prepared.

First, the condenser 30 is started (condenser starting step S2). Specifically, water is supplied to the condenser 30. Subsequently, the condensate pump 40 is started, and circulation (supply of water to the boiler (not shown)) of water is started through the wastewater line L3. Additionally, supply of cooling water required for condensate processing to the condenser 30 is started.

Thereafter, the deaerator 50 is started (deaerator starting step S3). In this case, the heater 51 is started. Additionally, the opening and closing valve 81 of the second suction line L8 is opened. After the deaerator 50 is started, turning of the rotor 12 is started in the steam turbine 10. In this case, the rotating shaft 15 rotates with the seal body 725 and the seal projections 151 being in contact with each other. Accordingly, entry of air from the inside of the casing 11 to the outside is prevented by the seal body 725 and the seal projections 151. Additionally, in the steam turbine 10, supply of seal air or lubricating oil to predetermined respective parts, such as bearings, is started.

Next, the vacuum pump 60 is started (vacuum pump starting step S4). Due to the activation of the vacuum pump 60, the pressure inside the condenser 30 and the deaerator 50 declines and becomes a negative pressure.

Next, the steam turbine 10 is started (steam turbine starting step S5). For this, the opening and closing valve 18 is opened, and the steam created by the boiler (not shown) is introduced into the casing 11 through the steam inlet 13 from the steam supply line L1. After a warm-up operation is executed multiple times by introducing the steam into the casing 11, the rotational speed of the rotor 12 is increased to a rated speed.

In a case where the pressure of the steam within the casing 11 becomes equal to or higher than a predetermined pressure due to the rated operation of the steam turbine 10, the pressure inside the accommodating recess 751 becomes a negative pressure due to the negative-pressure introduction part 74 (negative-pressure step S6). Specifically, as the pressure of the steam within the casing 11 becomes equal to or higher than the specified value, the control valve 78 is opened by the control device 100. Here, the pressure of the steam within the casing 11 becoming equal to or higher than the predetermined pressure value, for example, may be ascertained by detecting the pressure within the casing 11 and may be ascertained by detecting an inflow steam amount to the steam turbine 10.

If the control valve 78 is opened, in the shaft sealing device 70, the inside of the condenser 30 which has been made into a negative pressure by the vacuum pump 60 and the inside of the accommodating recess 751 are allowed to communicate with each other by the negative-pressure introduction part 74. As a result, the inside of the accommodating recess 751 is made into a negative pressure. Accordingly, pressure-receiving part 721 moves to the outside of the radial direction Dr, and a gap is formed between the seal body 725 and the seal projections 151. A portion (this is referred to as leaked steam) of the steam within the casing 11 leaks out to the outside of the casing 11 through the gap between the opening 17 of the casing 11 and the rotating shaft 15, which is formed in this way. By virtue of the leaked steam leaking from the casing 11, the gap between the opening 17 of the casing 11 and the rotating shaft 15 is sealed, and entry of air from the outside of the casing 11 to the inside is prevented.

During the rated operation of the steam turbine 10, the above state is maintained. Accordingly, the seal between the opening 17 of the casing 11 and the rotating shaft 15 is made by the leaked steam.

During the rated operation of the steam turbine 10, the steam discharged from the steam turbine 10 is fed into the condenser 30 through the steam discharge line L2. The condenser 30 cools the steam fed thereinto from the steam discharge line L2, thereby condensing the steam. The condensed water passes through the wastewater line L3 from the condenser 30 and is circulated to the boiler (not shown) via the condensate pump 40.

Additionally, the leaked steam that is leaked from the gap between the opening 17 of the casing 11 and the rotating shaft 15 is fed into the deaerator 50 via the leaked steam line L4. In the deaerator 50, the leaked steam is deaerated in an environment in which the heating caused by the heater 51 and the negative pressure caused by the vacuum pump 60 are applied, and is separated into water and air. The separated air is suctioned out of the deaerator 50 by the vacuum pump 60, passes through the first suction line L7, and is released to the outside through the drain separator 61. On the other hand, the water separated by the deaerator 50 is supplied to the condenser 30 through the condensate recovery line L6.

When the steam turbine system 1 is stopped, the opening and closing valve 18 is closed, the supply of the steam to the steam turbine 10 through the steam supply line L1 is reduced, and the rotation of the rotor 12 is stopped.

Thereafter, the vacuum pump 60 is stopped, and the pressures within the condenser 30 and the deaerator 50 are raised. Further, a drain valve (not shown) provided in the steam turbine 10 is opened, and a vacuum state within a system of the steam turbine 10 and the condenser 30 is released. In this case, the control valve 78 is closed by the control device 100. If the control valve 78 is closed, in the shaft sealing device 70, a communication state between the condenser 30 and the accommodating recess 751 is released. As a result, the pressure within the accommodating recess 751 rises. Accordingly, the pressure-receiving part 721 is moved inward in the radial direction Dr by the biasing member 73, and the seal body 725 and the seal projections 151 are in contact with each other. In this state, the turning of the rotor 12 is started in the steam turbine 10. In this case, the rotating shaft 15 rotates with the seal body 725 and the seal projections 151 being in contact with each other. Accordingly, the gap between the opening 17 of the casing 11 and the outer peripheral surface 15*f* of the rotating shaft 15 is sealed, and entry of air from the inside of the casing 11 to the outside is prevented.

Next, the condensate pump 40 is stopped, and the supply of the cooling water to the condenser 30 and the supply of water to the boiler (not shown) are stopped. Thereafter, the turning of the rotor 12 is stopped in the steam turbine 10. Thereafter, after the supply of the lubricating oil and the seal air to the respective parts in the steam turbine 10, a drain valve (not shown) is closed. Accordingly, the operation of the steam turbine system 1 is stopped.

As described above, according to the steam turbine system 1, the leaked steam, which has leaked from the gap between the casing 11 and the rotating shaft 15 to the outside of the casing 11, is supplied to the deaerator 50 brought into the negative pressure by the vacuum pump 60 and is deaerated. Accordingly, the water recovered from the leaked steam is not thrown away but supplied to the condenser 30 or to the boiler for generating the steam, whereby the water can be reused. In this way, the leaked steam can be recovered and effectively used. Additionally, by lowering the pressure within the deaerator 50 with the vacuum pump 60, the deaerated air can be discharged to the outside without providing an ejector. Hence, it is unnecessary to use auxiliary steam as a drive source of the ejector. In this way, the leaked steam is processed without using the auxiliary steam. For that reason, it is unnecessary to provide a ground condenser in order to process the leaked steam, and locations for using the auxiliary steam can be reduced.

Additionally, the water recovered by the deaerator 50 is returned to the condenser 30. For that reason, the water recovered by the deaerator 50 can be effectively used.

Additionally, the inside of the condenser 30 is made into a negative pressure by the vacuum pump 60 that makes the inside of the deaerator 50 into the negative pressure. For that reason, the air within the condenser 30 can be discharged to the outside without providing the ejector in order to lower the pressure within the condenser 30. Hence, it is unnecessary to use the auxiliary steam as the drive source of the ejector. Accordingly, locations for using the auxiliary steam can be further reduced.

Additionally, the leaked steam, which has been supplied to the deaerator 50 and condensed, is heated by the heater 51. For that reason, the deaeration of the leaked steam can be promoted, and the deaeration can be efficiently performed.

Additionally, the shaft sealing device 70 that seals the gap between the opening 17 and the rotating shaft 15 includes the biasing member 73 and the negative-pressure introduction part 74. In such a configuration, at the time of the stop and the activation of the steam turbine 10, the sealing performance between the rotating shaft 15 and the opening 17 of the casing 11 is ensured by the seal member 72 being biased inward in the radial direction Dr by the biasing member 73. Accordingly, at the time of the activation of the steam turbine 10, it is limited that external air flows into the casing 11 from between the rotating shaft 15 and the opening 17 of the casing 11. Hence, at the time of the activation of the steam turbine 10, it is unnecessary to supply the auxiliary steam to the shaft sealing device 70 from the outside as the seal steam for sealing between the rotating shaft 15 and the opening 17 of the casing 11. Accordingly, locations for using the auxiliary steam can be further reduced.

Additionally, according to the configurations as described above, it is unnecessary to use the auxiliary steam itself for the steam turbine system 1. For that reason, facilities, such as pipes and valves for supplying the auxiliary steam, staff for performing opening and closing of the valves, and the energy for creating the auxiliary steam are unnecessary. As a result, labor and costs for running the steam turbine system 1 can be reduced.

Additionally, in a state where the rated operation of the steam turbine 10 is performed, the inside of the accommodating recess 751 is made into a negative pressure by the negative-pressure introduction part 74. Accordingly, the seal body 725 can be moved to the outside of the radial direction Dr, and can be spaced apart from the seal projections 151 on the outer peripheral surface 15*f* of the rotating shaft 15. Even in this state, the pressure within the casing 11 is made high during the rated operation. Accordingly, the steam supplied within the casing 11 leaks out from the gap between the rotating shaft 15 and the opening 17 of the casing 11 to the outside. As a result, it is possible to avoid the suction of air into the casing 11, and even in a state where the seal member 72 and the rotating shaft 15 are separated from each other, the sealing performance in the gap between the rotating shaft 15 and a casing 11 can be ensured. Additionally, at the time of the rated operation, damage to the seal body 725 caused by coming into contact with the seal projections 151 that rotate can be limited by the rotating shaft 15 and the seal member 72 being separated from each other.

Additionally, the seal member 72 is provided with the seal body 725 made of the abradable material. Accordingly, at the time of the activation of the steam turbine 10, the gap between the rotating shaft 15 and the opening 17 of the casing 11 can be brought close to 0 (zero), and high sealing performance can be exhibited. Accordingly, the amount of suction of air into the casing 11 from the outside can be limited to the minimum.

Additionally, by controlling the opening and closing of the control valve 78 depending on the operation of the steam turbine 10 with the control device 100, the adjustment of pressure within the accommodating recess 751 by the negative-pressure introduction part 74 can be executed irrespective of a worker. For that reason, for example, the forward and backward movement timing of the seal member 72 can be automatically controlled. Accordingly, it is possible to mitigate labor for operating the respective parts at the time of the activation of the steam turbine system 1.

Additionally, when the steam turbine 10 starts its activation and the pressure of the steam within the casing 11 is equal to or higher than the predetermined pressure, the control valve 78 is opened and the negative-pressure introduction part 74 lowers the pressure within the accommodating recess 751. Accordingly, in the shaft sealing device 70, the gap between the opening 17 of the casing 11 and the rotating shaft 15 can be opened at a timing when the pressure of the steam within the casing 11 rises and reliably functions as the seal steam.

Additionally, the opening-and-closing control of the control valve 78 can be performed using the pressure within the casing 11 (machine pressure). Hence, it is unnecessary to separately include a pressure limiting valve that detects the pressure of the seal steam, and a pipe therefor, and simplification of devices that constitute the system can be achieved.

Additionally, the negative-pressure introduction part 74 uses the condenser 30 or the vacuum pump 60 as the negative-pressure source. Accordingly, it is unnecessary to prepare a separate negative-pressure source in order to move the seal member 72 forward and backward, and an increase in the devices provided in the system can be limited.

Although the embodiment of the invention has been described above in detail with reference to the drawings, the respective components, combinations thereof, or the like in the embodiment are exemplary. Additions, omissions, substitutions, and other modifications of the components can be made without departing from the spirit of the invention. Additionally, the invention is not limited by the embodiment, and is limited only by the scope of the claims.

INDUSTRIAL APPLICABILITY

According to the above-described steam turbine system and method for starting the steam turbine, locations for using the auxiliary steam can be reduced.

REFERENCE SIGNS LIST

1: steam turbine system
10: steam turbine
11: casing
12: rotor
13: steam inlet
14: steam outlet
15: rotating shaft
15a, 15b: end part
15f: outer peripheral surface
16: turbine blade
17: opening
18: opening and closing valve
20: compressor
21: connecting shaft
30: condenser
40: condensate pump
41: opening and closing valve
42: opening and closing valve
50: deaerator
51: heater
60: vacuum pump
61: drain separator
70: shaft sealing device
71: housing
72: seal member
73: biasing member
74: negative-pressure introduction part
75: groove
76: sealing member
78: control valve
100: control device
151: seal projection
721: pressure-receiving part
722: base part
723: coupling part
725: seal body
751: accommodating recess
752: communication part
Ac: central axis
Da: axial direction
Dr: radial direction
L1: steam supply line
L2: steam discharge line
L3: wastewater line
L4: leaked steam line
L5: circulation line
L6: condensate recovery line
L7: first suction line
L8: second suction line
S1: preparing step
S2: condenser starting step
S3: deaerator starting step
S4: vacuum pump starting step
S5: steam turbine starting step
S6: negative-pressure step

What is claimed is:

1. A steam turbine system comprising:
   a steam turbine having a casing into which steam is fed from an outside of the casing, and a rotating shaft that is provided within the casing so as to be rotatable around a central axis;
   a deaerator that is connected to the steam turbine and configured to deaerate leaked steam that has leaked from a gap between the casing and the rotating shaft to the outside of the casing;
   a vacuum pump that is connected to the deaerator and configured to lower a pressure within the deaerator;
   a condenser that is configured to condense the steam discharged from the steam turbine; and
   a shaft sealing device that is connected to the deaerator and is configured to seal the gap between the casing and the rotating shaft,
   wherein the shaft sealing device has:
      a seal member having a seal body that is configured to seal a portion between the seal body and an outer peripheral surface of the rotating shaft, and a pressure-receiving part that is connected to the seal body and is configured to move the seal body in a radial direction of the rotating shaft;
      a housing that holds the pressure-receiving part in an accommodating recess formed therein so as to be movable in the radial direction;
      a biasing member that is configured to bias the pressure-receiving part toward an inside of the radial direction; and
      a negative-pressure introduction part that is configured to make a pressure inside the accommodating recess lower than a pressure outside the housing, the negative-pressure introduction part being connected to the condenser or the vacuum pump as a negative-pressure source.

2. The steam turbine system according to claim 1, wherein the condenser is connected to the deaerator and is supplied with water recovered from the leaked steam deaerated by the deaerator.

3. The steam turbine system according to claim 2, wherein the vacuum pump is connected to the condenser.

4. The steam turbine system according to claim 1, wherein the deaerator has a heater that is configured to heat an inside thereof.

5. The steam turbine system according to claim 1, wherein the seal body is capable of coming in contact with the rotating shaft and includes a free-cutting material that is formed of a material having higher machinability than the rotating shaft.

6. The steam turbine system according to claim 1, further comprising:
   a control device that is configured to control the negative-pressure introduction part so as to lower a pressure within the accommodating recess depending on an operation of the steam turbine.

7. The steam turbine system according to claim 6, wherein the control device is configured to cause the negative-pressure introduction part to lower the pressure within the accommodating recess in a case where a pressure of the steam within the casing is equal to or higher than a predetermined pressure.

8. A method for starting a steam turbine system including a steam turbine having a casing into which steam is fed from an outside of the casing, a rotating shaft that is provided within the casing so as to be rotatable around a central axis, a condenser that is configured to condense the steam discharged from the steam turbine; a vacuum pump that is connected to the condenser and configured to lower a pressure within the condenser; and a shaft sealing device that is configured to seal a gap between the casing and the rotating shaft, the shaft sealing device having
- a seal member having a seal body that is configured to seal a portion between the seal body and an outer peripheral surface of the rotating shaft, and a pressure-receiving part that is connected to the seal body and move the seal body in a radial direction of the rotating shaft,
- a housing that holds the pressure-receiving part in an accommodating recess formed therein so as to be movable in the radial direction,
- a biasing member that is configured to bias the pressure-receiving part toward an inside of the radial direction, and
- a negative-pressure introduction part that is configured to make a pressure inside the accommodating recess lower than a pressure outside the housing, the negative-pressure introduction part being connected to the condenser or the vacuum pump as a negative-pressure source, the method comprising:
- a negative-pressure step of causing the negative-pressure introduction part to make the pressure within the accommodating recess into a pressure that is lower than the pressure outside the housing in a case where a pressure of the steam within the casing is equal to or higher than a predetermined pressure; and
- operating the steam turbine such that the pressure of the steam within the casing is equal to or higher than the predetermined pressure.

* * * * *